Jan. 1, 1952  M. I. STECKLER  2,580,859
SUPPLEMENTAL LENS MOUNT FOR SPECTACLES
Filed Oct. 4, 1949
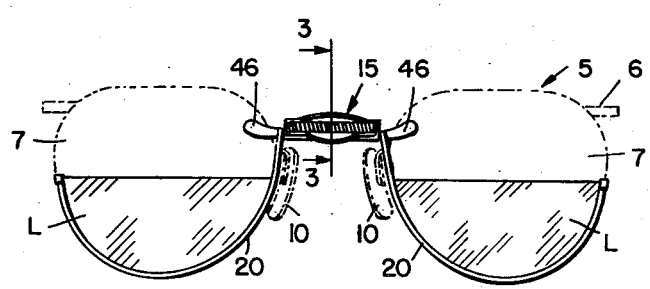
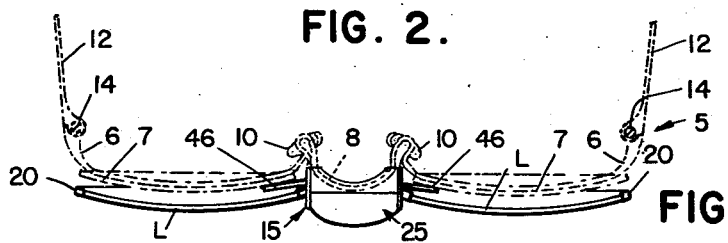
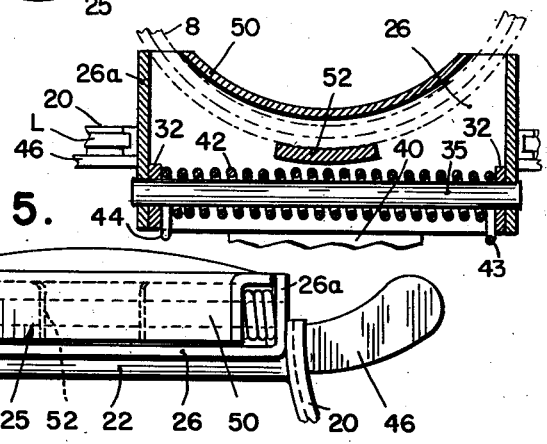
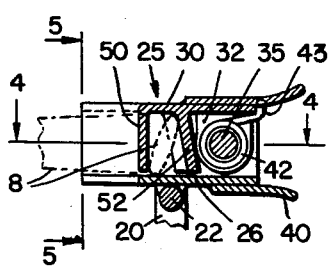
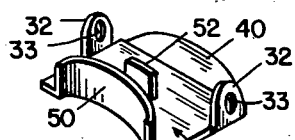
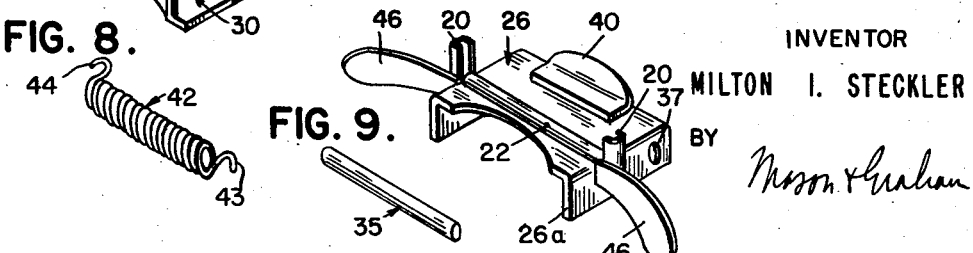
INVENTOR
MILTON I. STECKLER
BY
Mason + Graham
ATTORNEYS Patented Jan. 1, 1952

2,580,859

UNITED STATES PATENT OFFICE 2,580,859

SUPPLEMENTAL LENS MOUNT FOR SPECTACLES

Milton I. Steckler, Los Angeles, Calif.

Application October 4, 1949, Serial No. 119,451

3 Claims. (Cl. 88—41)

This invention has to do with spectacles, or eye glasses, and has as an object the provision of a supplemental lens mount adapted for quick attachment to the bridge of a spectacles' frame. Such supplemental lens mount may be used to mount either bi-focal or smoked or colored lenses.

It is a further object of my invention to provide a supplemental lens mount which is not only capable of being instantly installed on an eye glass frame, but which positively and firmly secures the supplemental lens elements in fixed relation to the main eye glass frame.

I am aware that others have proposed such supplemental lens mounts, but those of which I have knowledge have been of a complicated nature, which were costly to manufacture, difficult to install and which also somewhat interfered with the user's vision and interfered with the proper fitting of the bridge on the nose of the wearer. Another shortcoming of those prior mountings has been that they are inherently incapable of retaining the supplemental lens mount in a positive and firm manner, with the result that the supplemental lens easily swings out of proper position in relation to the main lens elements. It is an object of my invention to overcome those defects.

Other objects and advantages will appear hereinafter.

Without intending thereby to limit the broader scope of my invention as defined by the accompanying claims, I shall now describe it in one of its preferred embodiments, for which purpose I shall refer to the accompanying drawings, wherein:

Fig. 1 is a front elevation of a pair of spectacles carrying my supplemental lens mount;

Fig. 2 is a top plan view;

Fig. 3 is an enlarged section taken on line 3—3 of Fig. 1;

Fig. 4 is a further enlarged section taken on line 4—4 of Fig. 3;

Fig. 5 is an enlarged view taken on line 5—5 of Fig. 3;

Fig. 6 is an inverted perspective of the top jaw of the clamping element;

Fig. 7 is an inverted perspective of the bottom jaw of the element;

Fig. 8 is a perspective of the torsion spring element; and

Fig. 9 is a perspective of the hinge pin.

Referring now to the drawings, I show generally at 5 a conventional pair of spectacles embodying a main frame 6, mounting lenses 7 and having a curved bridge 8. The bridge carries the usual clamping elements 10 for clamping it onto the nose of the wearer. Temples 12 are hingedly secured to the frame 6 by hinges 14.

My supplemental lens mounting attachment, generally denoted 15, in one of its presently preferred forms comprises two U-shaped frame elements 20 connected by a bar 22. A supplemental lens L is carried by each of the frame elements 20. It is my preference that the supplemental lens mount be disposed in front of the main lens elements 7.

The principal feature of novelty of my supplemental lens mount resides primarily in the means which I shall now describe for detachably securing it to the bridge 8 of the spectacles.

As best illustrated in Figs. 3–9, I fix to the bar 22, as by welding or soldering, a channeled lower jaw element 26 of a bridge clamp generally designated 25. This jaw is shown inverted in Fig. 7. An upper jaw element 30 is pivotally mounted on the lower jaw by having depending ears 32, each having a hole 33 to pass the hinge pin 35, whose ends also extend through openings 37 in the end flanges 26a of the lower jaw. Finger engaging extensions 40 are secured, as by welding or soldering to the jaw elements 26, 30, although they may be formed as integral parts thereof, and a torsion spring 42 is disposed around the hinge pin, having one of its ends 43 engaging the lower jaw and having its other end 44 engaging the upper jaw, so as to urge the jaws to swing toward each other. In general construction, the clamp is thus in the form of a pinch clamp. Lateral extensions 46 are secured to the lower jaw and project outwardly therefrom in position to bear against the lens element 7 when the supplemental lens mount is attached to the spectacles' frame, in order to serve as a positive stop against swinging of the supplemental lens elements away from main lens elements. It will be apparent that when the user grasps the members 40 between the fingers and compresses them together the jaws swing relative to each other to permit attachment to the bridge.

In order positively and securely to retain the supplemental lens mount in proper position in relation to the spectacles, I provide the upper jaw with a depending arcuate flange 50 defining its inner edge, and spaced inwardly from the flange 50 I provide on the upper jaw another depending flange 52. As will be observed, the flanges 50 and 52 are curved to conform to the curvature of the bridge and define an arcuate channel for receiving the bridge, the channel being just wide enough to receive the bridge in a somewhat diagonal position as best shown in Fig. 3.

To mount the supplemental lens mount on the spectacles, the user grasps the members 40, presses them together and inserts the clamp over the bridge of the spectacles with the projections 46 bearing against the spectacles lens elements. Upon releasing the members 40, the spring causes the clamp to be firmly held in position on the bridge against accidental displacement, and the curvature of the bridge receiving channel prevents swinging of the clamp relative to the bridge.

I claim:

1. In a supplemental lens mount for a pair of spectacles having a curved bridge, an auxiliary lens mounting frame adapted, when attached to said bridge, to retain supplemental lenses adjacent the spectacle lenses, and means on said frame for releasably attaching said frame to said bridge; said means comprising a clamp having spring loaded jaws for clamping said bridge therebetween, one of said jaws having a pair of flanges defining an arcuate bridge receiving channel curved to conform to the curvature of said bridge.

2. In a supplemental lens mount for a pair of spectacles having a curved bridge, an auxiliary lens mounting frame adapted, when attached to said bridge, to retain supplemental lenses adjacent the spectacle lenses, and means on said frame for releasably attaching said frame to said bridge; said means comprising a pinch clamp having a pair of jaws pivoted to swing relative to each other, one of said jaws having a pair of transversely spaced depending flanges together defining an arcuate bridge receiving channel curved to conform to the curvature of said bridge, the outermost of the flanges defining the outer extremity of said clamp.

3. In a supplemental lens mount for a pair of spectacles having a curved bridge, an auxiliary lens mounting frame adapted, when attached to said bridge, to retain supplemental lenses adjacent the spectacle lenses, and means on said frame for releasably attaching said frame to said bridge; said means comprising a pinch clamp having a pair of jaws pivoted to swing relative to each other, one of said jaws having a pair of transversely spaced depending flanges together defining an arcuate bridge receiving channel curved to conform to the curvature of said bridge, the outermost of the flanges defining the outer extremity of said clamp, and a torsion spring disposed behind the inner one of said flanges, said spring urging the jaws toward each other.

MILTON I. STECKLER.

REFERENCES CITED

The following references are of record in the file of this patent:

UNITED STATES PATENTS

| Number | Name | Date |
|---|---|---|
| 2,284,630 | Banks | June 6, 1942 |
| 2,326,787 | Lorig | Aug. 17, 1943 |
| 2,380,638 | D'Urbano | July 31, 1945 |
| 2,408,273 | Sager | Sept. 24, 1946 |